(12) United States Patent
Harhira et al.

(10) Patent No.: US 11,092,553 B2
(45) Date of Patent: Aug. 17, 2021

(54) METHOD AND SYSTEM FOR CHARACTERIZING AN AGGREGATE SAMPLE BY USING LASER-INDUCED BREAKDOWN SPECTROSCOPY

(71) Applicant: National Research Council Of Canada (NRC), Ottawa (CA)

(72) Inventors: Aissa Harhira, Montreal (CA); Mohamad Sabsabi, Longoueil (CA); Josette El Haddad, Boucherville (CA); Alain Blouin, Montreal (CA)

(73) Assignee: National Research Council of Canada (NRC), Ottawa (CA)

( * ) Notice: Subject to any disclaimer, the term of this patent is extended or adjusted under 35 U.S.C. 154(b) by 112 days.

(21) Appl. No.: 16/465,240

(22) PCT Filed: Nov. 29, 2017

(86) PCT No.: PCT/CA2017/000255
§ 371 (c)(1),
(2) Date: May 30, 2019

(87) PCT Pub. No.: WO2018/098558
PCT Pub. Date: Jun. 7, 2018

(65) Prior Publication Data
US 2019/0346370 A1    Nov. 14, 2019

(30) Foreign Application Priority Data

Nov. 30, 2016  (CA) ................................. CA 2950163
Dec. 22, 2016  (CA) ................................. CA 2952551

(51) Int. Cl.
*G01J 3/30*    (2006.01)
*G01N 21/71*    (2006.01)
(Continued)

(52) U.S. Cl.
CPC ....... *G01N 21/718* (2013.01); *G01N 21/3103* (2013.01); *G01N 23/223* (2013.01); *G01N 2201/129* (2013.01)

(58) Field of Classification Search
CPC ............. G01N 21/718; G01N 21/3103; G01N 23/223; G01N 2201/129; G01N 21/88; G01N 21/85
See application file for complete search history.

(56) References Cited

U.S. PATENT DOCUMENTS

2018/0275068 A1*  9/2018  Ozcan .................... G01N 21/85

FOREIGN PATENT DOCUMENTS

CA    2287024       4/2001
CA    2953067      12/2015
(Continued)

*Primary Examiner* — Abdullahi Nur
(74) *Attorney, Agent, or Firm* — McMillan LLP

(57) ABSTRACT

A method for characterizing an aggregate sample involves using a first laser pulse to create a crater on the surface of a sample, using a second laser pulse to produce a plasma emission spectrum on the prepared crater surface, and detecting the emission spectrum to collect spectral data. Laser application, and detecting spectral emission are repeated on different points on the sample, then non-representative spectral data is discarded based on a ratio of ions to atoms in the data. Finally a calibration loading is used to determine a property characteristic of the aggregate sample. The sample may be an oil sands sample, and the properties detected may be percentages of bitumen, water, and solids. A laser-based system is provided for carrying out the characterization method.

36 Claims, 12 Drawing Sheets

(51) Int. Cl.
*G01N 21/31* (2006.01)
*G01N 23/223* (2006.01)

(56) References Cited

FOREIGN PATENT DOCUMENTS

DE 102008032532 2/2010
WO 2016070290 A1 5/2016

* cited by examiner

METHOD AND SYSTEM FOR CHARACTERIZING AN AGGREGATE SAMPLE BY USING LASER-INDUCED BREAKDOWN SPECTROSCOPY

FIELD OF THE INVENTION

The present invention relates generally to the characterization of an aggregate sample, and more specifically to a method and system for characterizing an aggregate sample by using Laser-Induced Breakdown Spectroscopy (LIBS).

BACKGROUND

An aggregate sample is a sample of material in a crushed, powder, or sandy form. The sample may be dry or wet and may comprise a number of constituent substances or elements. Examples of aggregate samples include: oil sands, potash, cement, fertilizer, soil, and flour. It is often desirable to characterize an aggregate sample to determine the properties and composition thereof. For example, it may be desirable to determine the percentage content of each of the constituent substances of the aggregate sample, or to determine water content of the sample. The characterization may be for the purpose of: quality control, certification, to optimize and fine-tune a production process, or for other purposes. Either X-Ray Fluorescence (XRF), or atomic spectroscopy may be used to determine the elemental content of solids in the sample. X-Ray Diffraction (XRD) may be used to assess the mineral composition of solids.

The determination of the water and solids content, as well as the elemental content, and mineral composition of the solids in an aggregate sample using the aforementioned techniques could take several hours. Furthermore, the full analysis cost is high. Therefore, there is a need for a method and a system for characterizing aggregate samples that overcome at least some of the disadvantages of the prior art.

Oil sands are either loose sands or partially consolidated sandstone containing a naturally occurring mixture of sand, clay, and water, saturated with a dense and extremely viscous form of petroleum technically referred to as bitumen. Natural bitumen deposits are reported in many countries, but in particular are found in extremely large quantities in Canada.

Bitumen is extracted from oil sands by various known processes. In general, separating bitumen from oil sands involves various treatment stages. The oil sand is excavated then undergoes comminution so that ore chunks are broken down into smaller pieces, which are fed to a flotation process wherein they are mixed with a process fluid and flotation agents to produce an oil sand slurry. The slurry then undergoes conditioning to create a froth mixture, which is then passed through a separation stage to separate the froth containing bitumen and the tailings from the soil. The extracted bitumen is then refined for use.

To control an oil sand treatment process, it is important to be able to characterize the oil sand by measuring the bitumen, water, solids, elemental content and mineral composition. This facilitates the control and optimization of the treatment process, as well as tuning the mine model. Some methods of characterizing oil sand ores are known. The methods typically involve performing several laboratory analyses. The Dean Stark extraction method is currently the standard method for determining the bitumen, water and/or solids content of an oil sand sample. Full extraction of bitumen from the solids, using Dean Stark, can take hours to complete. Once bitumen, water, and solids have been physically separated, solids can be analyzed by various means. Either XRF, or atomic spectroscopy may be used to determine the elemental content of the solids. XRD may also be used to assess the mineral composition of the solids.

The determination of the bitumen, water, and solids content, as well as the elemental content and mineral composition of the solids in an oil sands sample using the aforementioned techniques could take several hours. Furthermore, the full analysis cost is high, estimated at around few hundred of dollars per oil sands sample.

Recently, Near-Infrared Reflectance (NIR) measurements and Potassium-40 ($^{40}K$) radiation measurements have been used to estimate the oil sand bitumen and fines content on-line. Despite the advantages of these tools, they provide only limited information such as bitumen content and the trend of potassium, to assess the clay content in oil sands. Furthermore, the calibration of NIR analyzers requires a large number of reference samples.

There is a need for a method and a system for characterizing oil sand samples that overcome at least some of the disadvantages of the prior art.

SUMMARY OF THE INVENTION

According to one aspect of the invention, there is provided a method of determining at least one property of an aggregate sample. The method comprises applying a first laser pulse to the aggregate sample for creating a crater on a surface of the aggregate sample by shockwave effect. After applying the first laser pulse by a duration of time, applying a second laser pulse in the crater for producing a plasma spectral emission. The spectral emission is detected with at least one spectrum detector to collect spectral data. The steps of applying the first laser pulse, second laser pulse, and detecting the spectral emission are repeated on different locations on the aggregate sample. Non-representative spectral data is then excluded. The aggregate sample may be a soil sample, a fertilizer sample, a potash sample, a flour sample, a cement sample, or an oil sands sample. The spectral data may be averaged, and a calibration loading may be applied to determine the property of the oil sands sample.

The aggregate sample may be in motion, and the duration of time may be based on the speed of motion of the aggregate sample and selected such that the second laser pulse is applied in the crater formed by the first laser pulse.

The excluding of non-representative spectral data comprises an assessment of fluence produced by the second laser being applied to the crater.

The assessment of fluence may be based on a ratio of ions to atoms detected in the plasma spectral emission, which is determined by:

$$\frac{2(2\pi m_e k)^{3/2}}{h^3} \frac{1}{N_e} \left( \frac{g_i A_i \lambda_a}{g_a A_a \lambda_i} \right) T_e^{3/2} \exp\left(-\frac{E_{ion}}{kT_e}\right) \exp\left[\frac{-(E_{exc,i} - E_{exc,a})}{kT_{exc}}\right]$$

where h is the Planck constant, c is the velocity of light, $g_a$ is the statistical weight and $A_a$ the Einstein coefficient of the excited level of the atomic transition, $\lambda_a$ is the emission wavelength of the atomic transition, $N_a$ is the number density of atoms in the upper level, $T_{exc}$ is the excitation temperature, $U(T_{exc})$ is the partition energy, k is Boltzmann's constant, $E_{exc,a}$ is the atomic excited level energy, $m_e$ is the mass of the electron, $N_e$ is the electron number density, $g_i$ is the statistical weight and $A_i$ the Einstein coefficient of the excited level of the ionic transition, $\lambda_i$ is the emission wavelength of the ionic transition, $T_e$ is the ionization temperature, $E_{ion}$ is the ionization energy and $E_{exc,i}$ the ionic excited level energy.

The excluding of non-representative spectral data may be based on comparing the assessed fluence and a predetermined fluence range. The predetermined fluence range may be based on experimentation involving a test aggregate sample with a generally smooth surface. The excluding of non-representative spectral data also may be based on a selection tool, such as the total plasma intensity, the intensity of particular emission lines, or both. In addition, the excluding of non-representative spectral data may be based on statistical tools such as: medium absolute deviation method, minimum covariance determinant method, and principal component analysis (PCA).

The calibration loading may be obtained from a chemometric model relating spectral data obtained from a known aggregate sample to a reference value obtained from a physiochemical analysis method for determining the property for the known aggregate sample. Chemometric models may comprise one or more of: preprocessing methods, Partial Least Squares (PLS), Support Vector Machine (SVM), Principal Component Regression (PCR) methods and Artificial Neural Networks (ANN), or Chemometric classification and clustering methods.

The property to be determined may comprise the percentage content of one or more constituent substances in the aggregate sample. For an oil sands sample, the property to be determined may comprise the percentage content of one or more of: bitumen, water, and solids. The property may comprise at least one mineralogical composition. For an oil sands sample, the property may comprise at least one mineralogical composition selected from the group consisting of: quartz, kaolinite, illite, and total clays. In addition, for an aggregate sample, the property may comprise at least one element content. For an oil sands sample, the property may comprise at least one element content selected from the group consisting of: aluminum, potassium, and iron. The element content may be determined by calibrating normalized lines or raw lines of the element by reference values given by a known method of determination of elemental content. The known method of determination of elemental content may be one of: x-ray fluorescence and atomic absorption.

The property to be determined may be the percentage content of an element in the sample. The percentage content of the element may be determined based on a calibration with a reference value obtained from the Dean Stark method. For an oil sands sample, the property to be determined may be a percentage content of bitumen in the sample determined by calibrating carbon to silicon peak ratios with a reference value of bitumen obtained from the Dean Stark method. The percentage content of bitumen in the oil sands sample may also be determined by comparing the carbon to silicon ratios in the spectral emission with calibration data. For an aggregate sample, the percentage of content of the element may be determined from a chemometric model relating spectral data obtained from a known aggregate sample to a reference value obtained from the Dan Stark method. For an oil sands sample, the percentage of bitumen may also be determined from a chemometric model relating spectral data obtained from a known oil sands sample to a reference value obtained from the Dean Stark method.

According to another aspect of this embodiment, there is provided a system for characterizing an aggregate sample, comprising: a laser system capable of generating a first laser pulse and a second laser pulse separated in time by a predetermined duration, for forming a crater on a surface of the aggregate sample, and for producing plasma spectral emission from the sample in the same crater; a real-time distance sensor for measuring a distance to the surface of the aggregate sample; an automated optical focusing system for focusing the laser system on a spot on the surface of the aggregate sample; a spectral detector for detecting the spectral emission; and a computer system/electronics for processing spectral data and controlling the laser system. The laser system may comprise a first laser and a second laser.

The computer system comprises one or more of: a desktop computer, a laptop computer, an electronic board, and a tablet computer.

The computer system comprises a central processing unit (CPU), input/output, storage capabilities, and memory storing computer software which when executed by the CPU may control the energy of the first laser and second laser, such that the first laser pulse may form a crater on the surface of the sample, and such that the second laser pulse may form a plasma plume having spectral radiations which can be detected by the spectral detector.

The computer software when executed may read the distance value indicated by the distance measuring sensor, and use that distance value to control the automated optical focusing system for focusing the laser system on the spot on the surface of the aggregate sample.

The computer software when executed may acquire spectral data from the spectral detector, and compute a ratio of an intensity of an ionic species spectral line to an intensity of an atomic species spectral line.

The computer software when executed may perform statistical assessment on the computed ratio to discard spectral data which are outside of a predetermined fluence range which has been shown to produce representative spectral data. The software may also average the representative spectral data obtained from various points on the surface of the aggregate sample.

The computer software when executed may use a calibration loading obtained from one or more chemometric models relating an emission spectrum obtained from a known aggregate sample to a reference value obtained from a physiochemical analysis method for determining the property of the known aggregate sample.

The aggregate sample may be any one of: a soil sample, a cement sample, a potash sample, a flour sample, a fertilizer sample, and an oil sands sample.

BRIEF DESCRIPTION OF THE DRAWINGS

An embodiment will now be described, by way of example only, with reference to the attached figures, wherein.

DETAILED DESCRIPTION OF AN EMBODIMENT

While the background described above has identified particular problems known in the prior art, the present invention provides, in part, a new and useful application for a system and method for characterizing an aggregate sample by using laser-induced breakdown spectroscopy. The method provided can be applied to a sample in a lab, to a sample moving on a conveyor belt, to in-situ ore through an access hole, or to an exposed ore in a mine.

Laser-induced breakdown spectroscopy (LIBS) is a type of atomic emission spectroscopy which uses a laser pulse as the excitation source. A sample of material to be analyzed is excited by a laser beam. The laser is focused onto a small area on the surface of the sample, and when the laser is discharged it ablates a very small amount of material, which generates a plasma plume with very high temperatures. At those temperatures the ablated material breaks down into ions and atoms, and the plasma emits a continuum of radiation. Within a short time, the plasma expands and cools, and emissions (spectral lines) characteristic of the elements in the sample, can be observed.

In some instances, the surface of a sample of material is not characteristic of the elements in the sample. This may be due to oxidation or other factors. For example, when an aggregate sample has been on a conveyor for a period of time, humidity in the outer surface of the sample might vaporize and therefore an analysis or characterization thereof would not provide an accurate indication of the water content of the sample. It is thus desirable to develop a technique to excite and analyze emissions beneath the outer surface of the sample.

Figure 1:
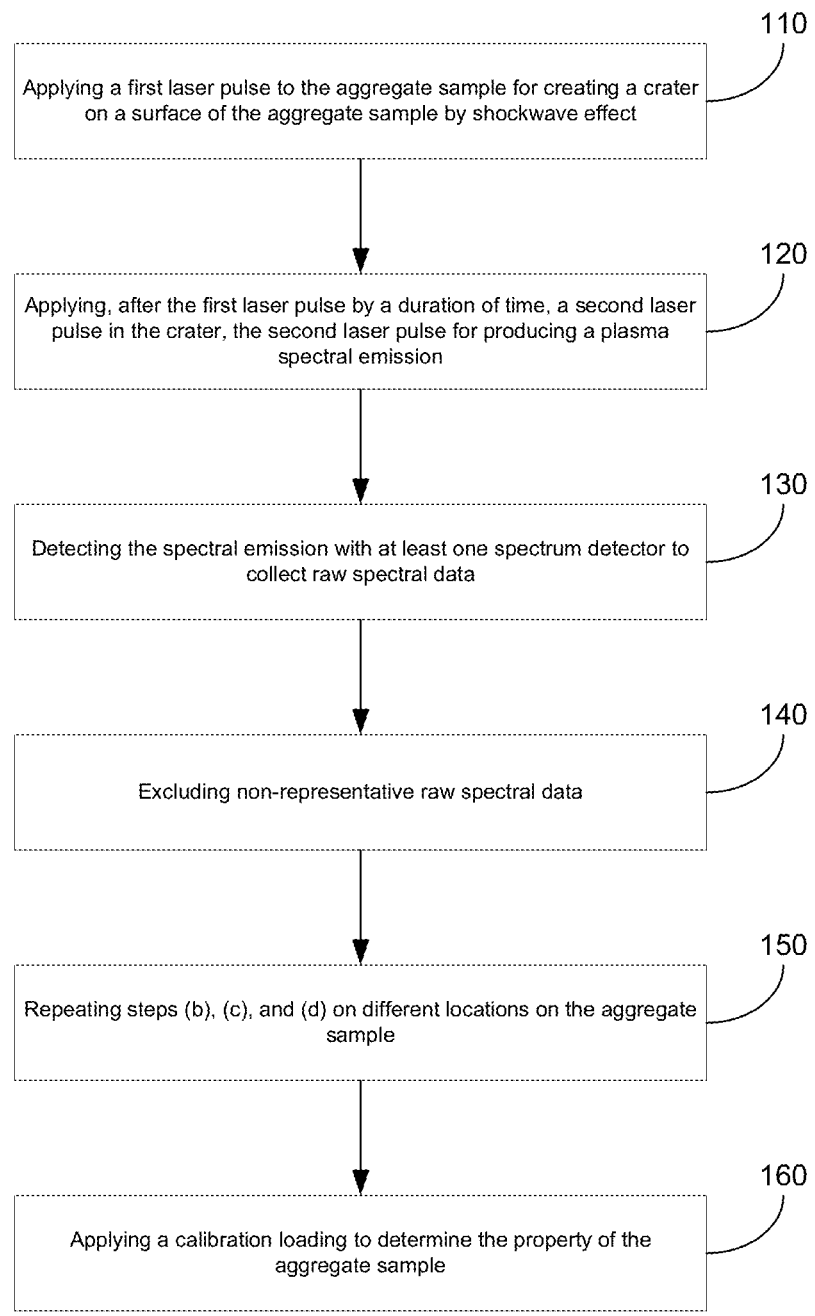
FIG. 1 shows a flow chart of a method of characterizing an aggregate sample, in accordance with an embodiment of the present invention.

In one aspect of the present invention, a method of determining a property of an aggregate sample is provided. With reference to FIG. 1, a method 100 of determining a property of an aggregate sample is provided. The aggregate sample may be placed on a conveyor moving with an appropriate speed. The method begins at step 110 by applying a first laser pulse, generated by a first laser, to the aggregate sample for creating a crater on a surface of the sample by shockwave effect. This removes the outer surface of the sample and exposes the material in the crater, which is deemed to be more characteristic of the sample. The first laser pulse provides sufficient power to the targeted area to produce a shockwave effect which creates a crater on the surface of the sample. The crater may, for example, have the shape of a hemisphere having a diameter of a few millimeters. The first pulse may generate a plasma plume. Since, as mentioned, the outer surface of the oil sample may not be characteristic of the aggregate sample, the radiation produced with the plasma plume generated by the first laser pulse is not analyzed. A spectral detector, that is part of the LIBS system, would not be enabled to detect the spectral radiation produced with the plasma plume generated by the first laser pulse.

As the first laser pulse may generate a plasma plume, the LIBS system waits until that plasma plume clears then applies a second laser pulse in the crater formed by the first laser pulse. Due to the motion of the sample on the conveyor, the second laser pulse needs to be applied within a brief duration of the first laser pulse, to ensure that the second laser pulse is applied in the crater formed by the first laser pulse. The duration between the first laser pulse and second laser pulse is therefore long enough to allow for the clearing of the plasma plume of the first laser pulse, but short enough to ensure that the sample has not moved significantly that the second laser pulse would miss the crater formed by the first laser pulse. Accordingly, the duration depends, at least in part, on the speed of the conveyor carrying the aggregate sample. In one example, the second pulse is applied 10-50 microseconds after the first pulse is applied.

At step 120 a second laser pulse is applied, in the crater formed by the first laser pulse. The second laser pulse may be applied using the same laser which applied the first laser pulse, or by a second laser. The use of a second laser may be necessary if there are technical limitations preventing the same (first) laser from producing a second laser pulse within a brief duration of the first laser pulse as to be able to apply the second laser pulse to the crater formed by the first laser pulse, despite the motion of the sample on a conveyor as discussed above. The second laser pulse may have more or less energy than the first laser pulse. The second laser pulse ablates the sample producing a plasma plume. The approach described by the present invention is different from what is known in the art as generating a plasma by double pulse mode. In a double pulse mode the first pulse creates the plasma on the sample to be analyzed and the second pulse is used to reheat the plasma to enhance its emission. In the approach described by the present invention the first pulse is to create a crater and prepare a surface representative of the bulk for analysis while the second pulse is used to interrogate the prepared surface in the crater created by the first pulse. Initially the plasma plume is very hot, as is known in the art, with temperatures in excess of 100,000 K. After local thermodynamic equilibrium is reached, the plasma temperatures range from 5,000 to 20,000 K. At that high temperature, the ablated material disassociates into excited ions and atomic species, and a continuum of radiation is emitted by the plasma. The continuum of radiation does not contain useful information about the species present in the sample. This is due to the presence of radiation from many different sources, such as ions and atoms. However, within a small time frame, the plasma expands at very high velocities and then cools. Subsequent to that, the plasma emits spectral radiation that is characteristic of the elements present in the aggregate sample. A spectral detector is enabled at this point, and is used to detect the characteristic spectral radiation at step 130.

To get an accurate determination of the characteristics of an aggregate sample, multiple test points are used on the sample to overcome the non-homogeneity. For each test point a crater is formed using a first laser pulse, then a second laser pulse is applied to the surface of the formed crater. Due to the irregularities in the sample surface, the plasma plume produced in step 120, may not always be consistent and having the same laser fluence between different test points on the same sample. For example, as the laser beam is focused on a first crater on the sample, the energy applied to the crater surface is dependent on the area of focus of the beam. When a second crater is formed, and a subsequent laser pulse is applied to the second crater, the distance between the laser source and the surface of the second crater may be different from the distance between the laser source and the surface of the first crater. This is due to the fact that the sample surface is not perfectly flat and uniform, but rather irregular. Accordingly, the area of focus of the laser beam may be different between the first crater and the second crater, and therefore the surface of the crater may undergo a different level of excitation. The fluence produced by the laser pulse, therefore, varies between different test points on the surface of the same aggregate sample. As a result, laser pulses with the same energy at the laser source when applied to different craters would yield different amplitudes for the spectral lines corresponding to the same element. As such, when correlating the spectral information corresponding to the same element with calibration data, different percentages indicating the content of the element in the sample are reported for the various test points on the same sample. This inconsistency is undesirable as the percentage of content of an element should have the same reading within the uncertainty of the measurements for the same sample.

At step 140, non-representative raw spectral data is excluded. An assessment of the fluence through the plasma spectral emission produced by the second laser pulse applied to the crater is performed. This comprises monitoring the ratio of the intensity of an ionic species spectral line ($I_i$) to the intensity of an atomic species spectral line ($I_a$). The intensity of an atomic spectral line is a function of the population density of the upper excited energy level $N_a$ and the excitation temperature $T_{exc}$, through the following Boltzmann relation:

$$I_a = \frac{hc}{4\pi} \frac{g_a A_a}{\lambda_a} \frac{N_a}{U(T_{exc})} \exp\left(-\frac{E_{exc,a}}{kT_{exc}}\right)$$

Where h is the Planck constant, c is the velocity of light, $g_a$ is the statistical weight, $A_a$ is the Einstein coefficient of the excited level of the atomic transition, $\lambda_a$ is the emission wavelength of the atomic transition, $N_a$ is the number density of atoms in the upper excited energy level, $T_{exc}$ is the excitation temperature, $U(T_{exc})$ is the partition energy, k is Boltzmann's constant, and $E_{exc,a}$ is the atomic excited level energy.

Hence the expression of the ratio of the intensity of the ionic species spectral line ($I_i$) to the atomic species spectral line ($I_a$) is given by the Saha equation:

$$\frac{I_i}{I_a} = \frac{2(2\pi m_e k)^{3/2}}{h^3} \frac{1}{N_e} \left(\frac{g_i A_i \lambda_a}{g_a A_a \lambda_i}\right) T_e^{3/2} \exp\left(-\frac{E_{ion}}{kT_e}\right) \exp\left[\frac{-(E_{exc,i} - E_{exc,a})}{kT_{exc}}\right]$$

where $m_e$ is the mass of the electron, $N_e$ is the electron number density, $g_i$ is the statistical weight and $A_i$ the Einstein coefficient of the excited level of the ionic transition, $\lambda_i$ is the emission wavelength of the ionic transition, $T_e$ is the ionization temperature, $E_{ion}$ is the ionization energy and $E_{exc,i}$ the ionic excited level energy.

Through calibration and validation experimentations on samples with smooth and regular surfaces, a certain fluence range where the spectral information is representative of the aggregate sample content is determined. The above $I_i/I_a$ ratio is correlated to the fluence of the laser pulse. Therefore, the fluence can be monitored directly from the above $I_i/I_a$ ratio, and therefore spectral readings having an $I_i/I_a$ ratio corresponding to a fluence range that is outside of the determined range are excluded from the spectral data used to determine the aggregate sample composition. The above $I_i/I_a$ ratio may also be assessed during the measurement from a plurality of readings. For example, 1000 spectral data readings are acquired. From these 1000 readings, the $I_i/I_a$ ratio is assessed by using statistical tools such as medium absolute deviation method to detect non representative ratios, once the non-representative spectral data are excluded, the remain spectral data are averaged and ready to determine the desired property using a calibration loading.

In order to obtain an accurate representation of the aggregate sample composition, the above steps are repeated for a number of test points on the sample, as indicated by step 150. Various analytical methods are used to determine the sample composition from a plurality of readings. For example, the spectral data corresponding to a particular material may be averaged for all targeted points on the sample which have produced characteristic spectral readings with a useful fluence range.

At step 160, a calibration loading is applied to determine the desired property of the sample. The calibration loading is obtained from a chemometric model relating an emission spectrum obtained from a known aggregate sample to a reference value obtained from a physiochemical analysis method for determining the characteristics of the known aggregate sample.

The above method may be applied to an oil sands sample placed on a moving conveyor. The conveyor may be moving at a velocity of 0.5 to 1.0 meter per second. The steps 110 to 160 may be applied to the oil sands sample as described. The calibration loading, applied at step 160, may be obtained from a chemometric model relating an emission spectrum obtained from a known oil sands ore sample to a reference value obtained from a physiochemical analysis method for determining the characteristics of the known oil sands sample.

Figure 2:
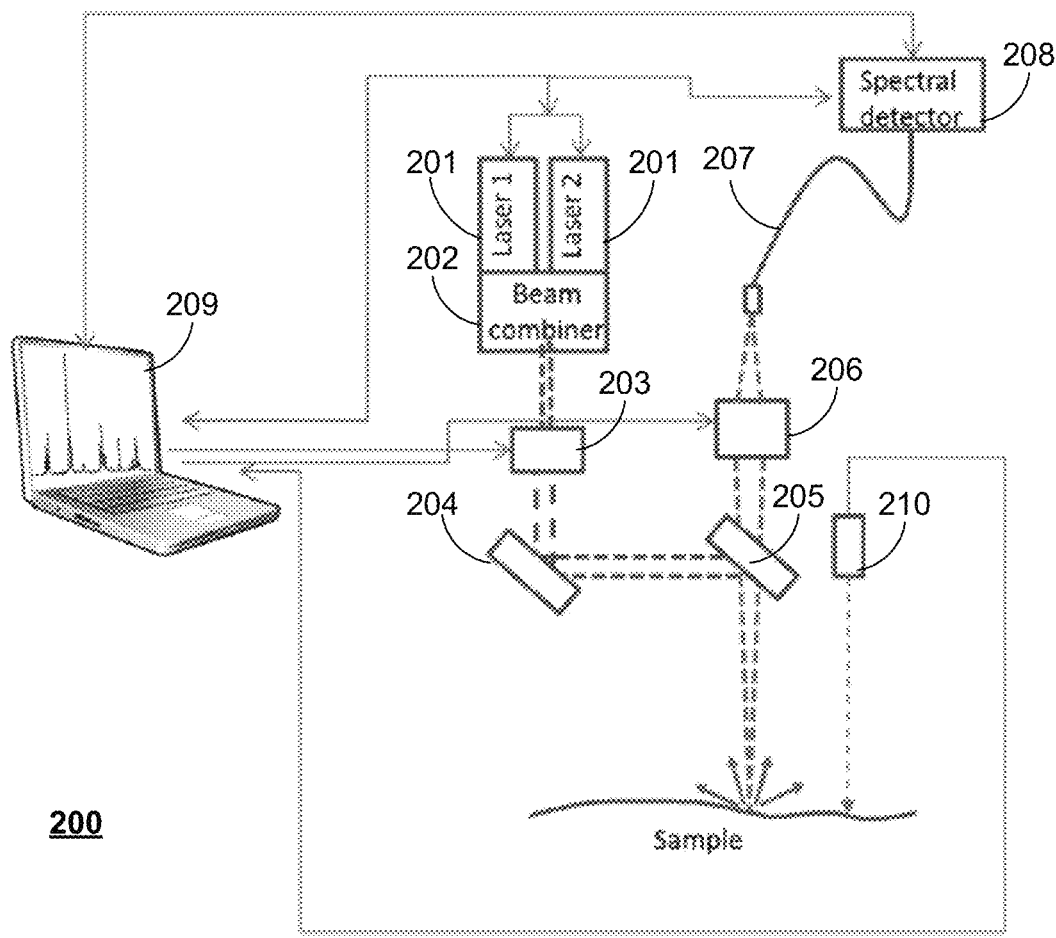
FIG. 2 is a simplified illustration of a Laser Induced Breakdown Spectroscopy (LIBS) system for characterizing an aggregate sample, in accordance with an embodiment of the present invention.

Turning now to FIG. 2 which shows a system for determining the properties of an aggregate sample, the system comprising: a first and a second laser 201 both coupled with beam combining optics 202. The pulse energy of the first and the second laser are independent from each other, but they have to fulfill some conditions as it follows: the first laser pulse energy should be sufficient to produce a shock wave and the second laser pulse should exceed the threshold of ablation to make a breakdown on the prepared surface. For example, as discussed earlier, the first laser pulse and the second laser pulse may be separated by a brief duration that is long enough so that the plasma plume from the first laser pulse has cleared, but short enough such that a moving sample will be in substantially the same place so that the second laser pulse targets the crater formed by the first laser pulse. As an example, a duration of 50 microseconds may be used between the first laser pulse and the second laser pulse.

A typical laser wavelength utilized in an embodiment is 1064 nm, and the laser energy output is around 10-200 mJ.

The combined laser beams pass through an automated optical focusing system 203 which allows focusing the combined and coaxial laser beam at the focal plane on the aggregate sample. In some embodiments, the laser beam is focused on a spot size of approximately 500 micrometer on the aggregate sample surface. The automated optical focusing system 203 is comprised of two lenses with a variable separation there between. The focusing system 203 utilizes a motorized linear stage to displace one of the two lenses towards or away from the other lens. A real-time distance measuring sensor 210 provides a distance value representing the distance between the focusing system and the aggregate sample. The distance value is fed to computer system 209. The computer system causes the optical focusing system 203 to adjust the distance between the two lenses based on the distance value to keep the combined laser beam substantially focused on the aggregate sample surface despite irregularities and variations in height of the aggregate sample surface.

The laser beam pulse passing through the optical focusing system 203 is reflected by a reflective mirror 204, and a dichroic mirror 205 onto the sample surface. Reflective mirror 204 and dichroic mirror 205 are both preferably angled at 45 degrees as shown. As a first laser pulse creates a crater and a second laser pulse creates a plasma plume, as described above, the emission spectrum emitted by the plasma plume passes through the centre of the dichroic mirror 205 and is then focused by an achromatic lens 206 onto the entrance point of an optical fiber bundle 207. The emission spectrum then exits the exit point of the optical fiber bundle 207 and enters spectral detector (spectrometer) 208.

In some embodiments computer system 209 may be comprised of multiple components such as one or more of: a desktop computer, a laptop computer, an electronic board, and a tablet computer. The components are operatively connected to perform the functions required by the LIBS system. For example, a combination of a laptop computer and an electronic board operatively connected to the laptop computer may be used. The laptop computer may download software do the electronic board to perform some of the functionality of the system as described below. Communications between the computer and the board may carry instructions to transfer data to the computer or to issues commands to the board to perform control operations, for example. The communications channel between the computer and the board may utilize one or more of: a serial connection, a parallel connection, a universal serial bus connection, a local area network connection, or a wireless connection.

The computer system 209 comprises a central processing unit (CPU), memory, input/output, and storage capabilities. The memory stores computer software which when executed by the CPU may:

control the energy of two lasers such that the first laser pulse may form a crater on the surface of the sample, and such that the second laser pulse may form a plasma plume having spectral radiations which can be detected by spectral detector 208.

read the distance value indicated by the distance measuring sensor 210, and use that distance value to control the motorized linear stage so as to adjust the distance between lenses in the optical focusing system 203 to keep the laser beam focused on a focusing spot on the surface of the sample.

Acquire raw spectral data from the spectral detector 208.

compute the ratio of the intensity of the ionic species spectral line to intensity of the atomic species spectral line.

perform statistical assessment on the computed ratio to discard spectral data which are outside of the desired fluence range which has been shown to produce representative spectral data.

perform statistical assessments and tests on other parameters such as plasma intensity, and line intensities.

average the representative spectral data obtained from various points on the surface of the sample; and use the calibration loading obtained from chemometric models relating an emission spectrum obtained from a known sample to a reference value obtained from a physiochemical analysis method for determining the at least one component of interest of the known sample.

Figure 3:
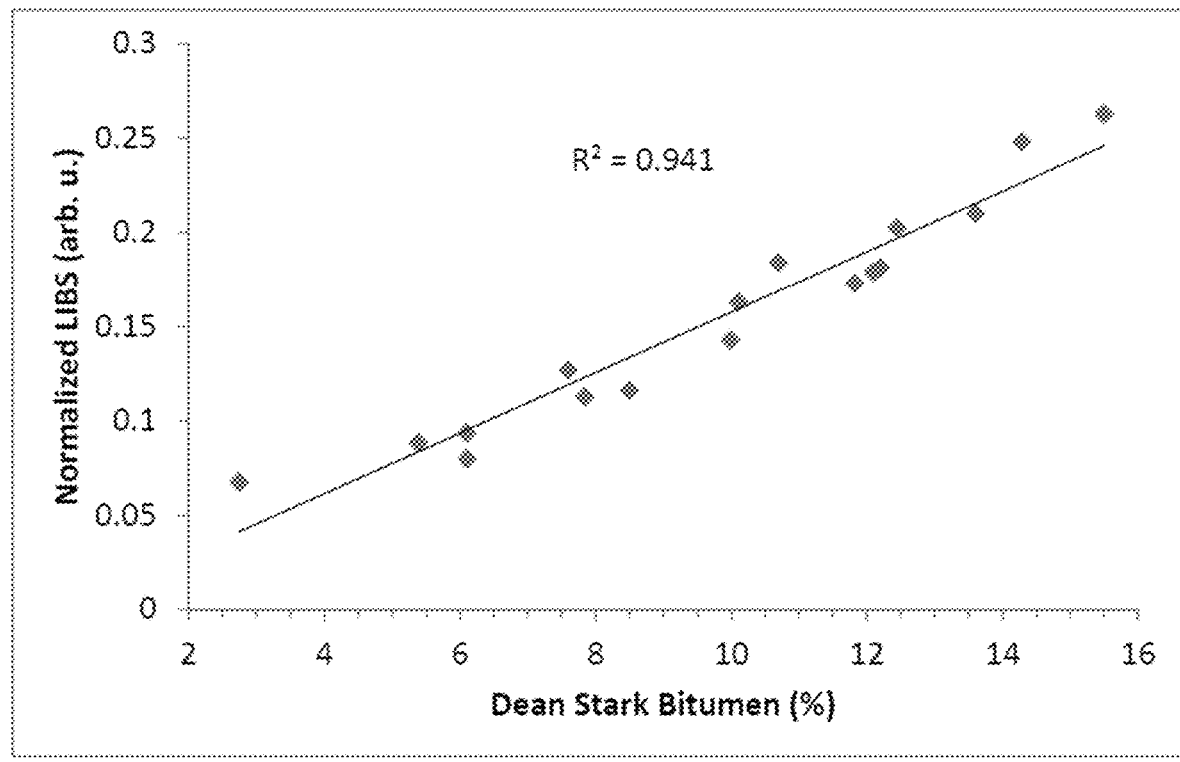
FIG. 3 is graph, for an oil sands sample, depicting normalized LIBS carbon line signal versus percentage bitumen determined using the Dean-Stark method.
Figure 4:
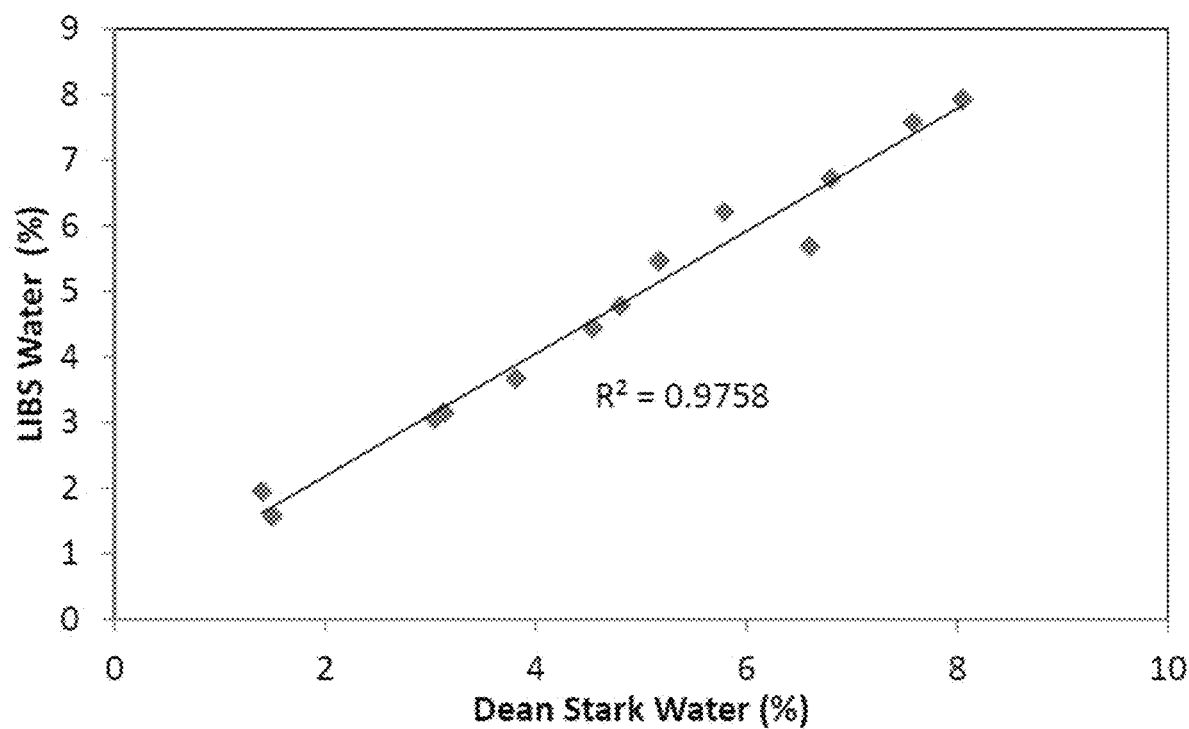
FIG. 4 is a graph, for an oil sands sample, depicting LIBS percentage water results versus percentage water determined via the Dean-Stark method.
Figure 5:
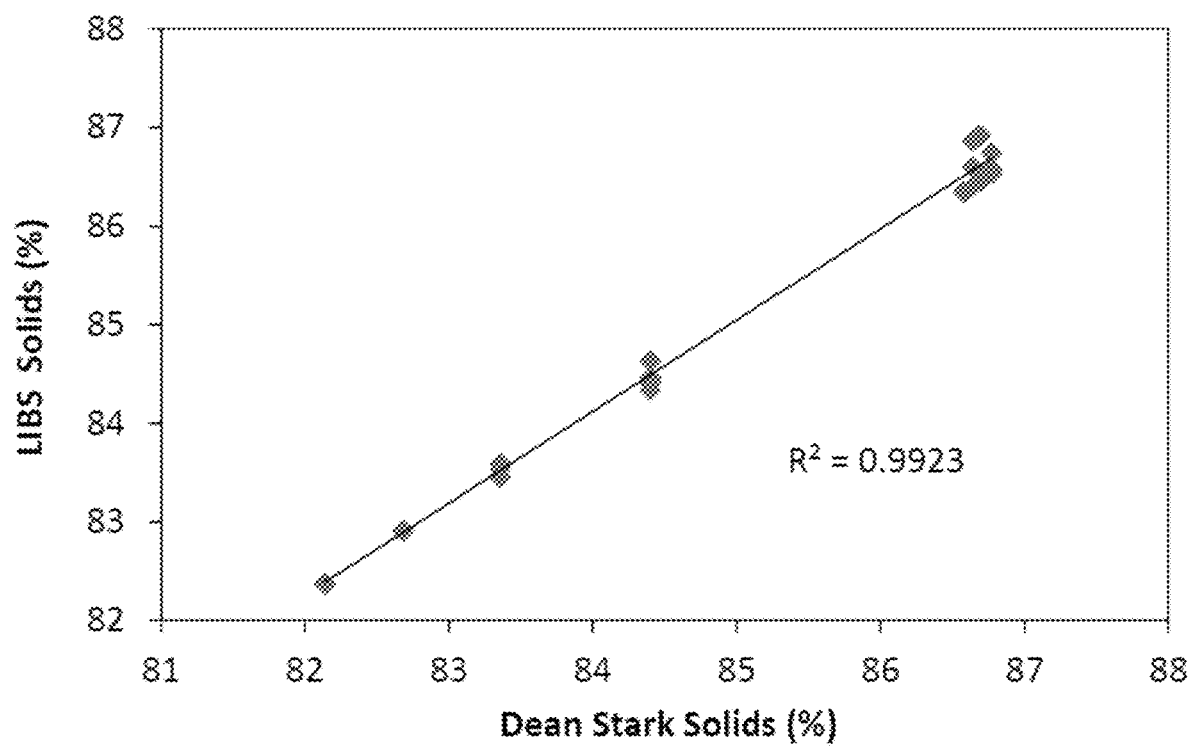
FIG. 5 is a graph, for an oil sands sample, depicting, for an oil sands sample, LIBS percentage solids results versus total solids determined via the Dean-Stark method.
Figure 6:
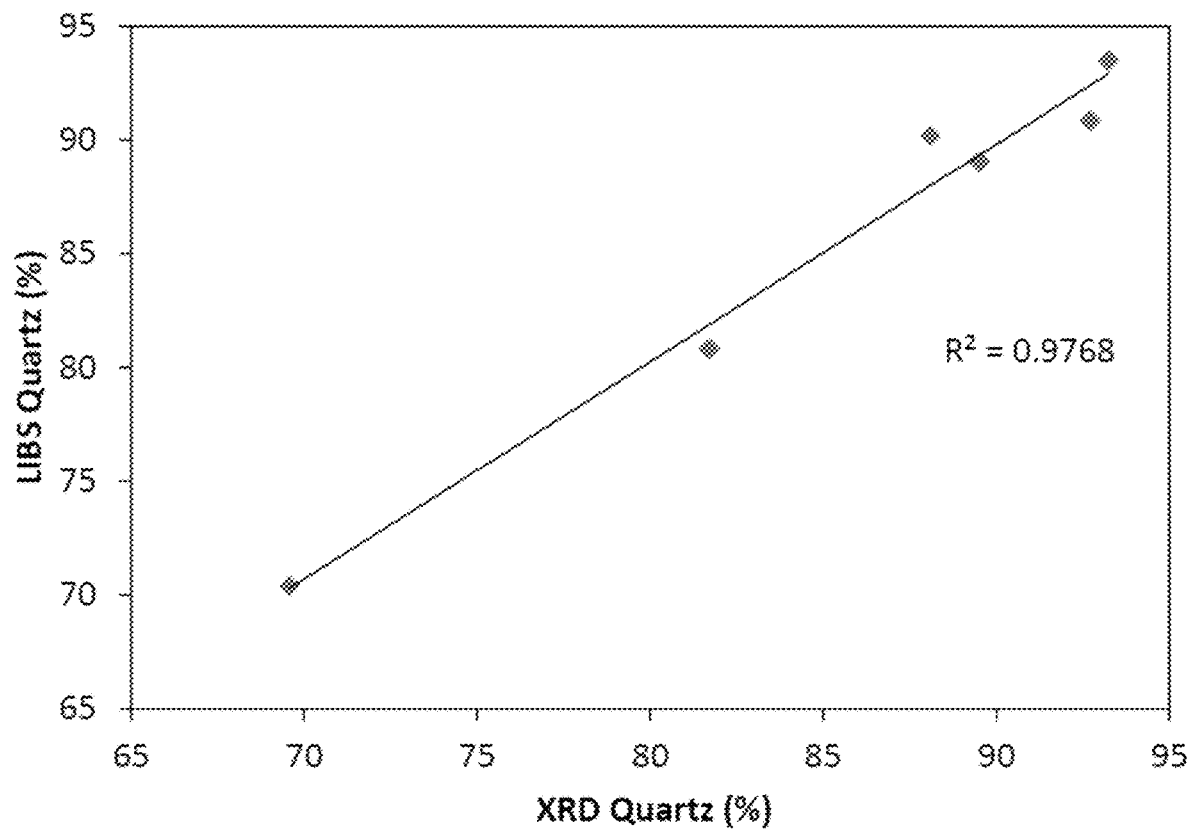
FIG. 6 is a graph, for an oil sands sample, depicting LIBS percentage quartz results versus percentage quartz determined using x-ray diffraction (XRD)
Figure 7:
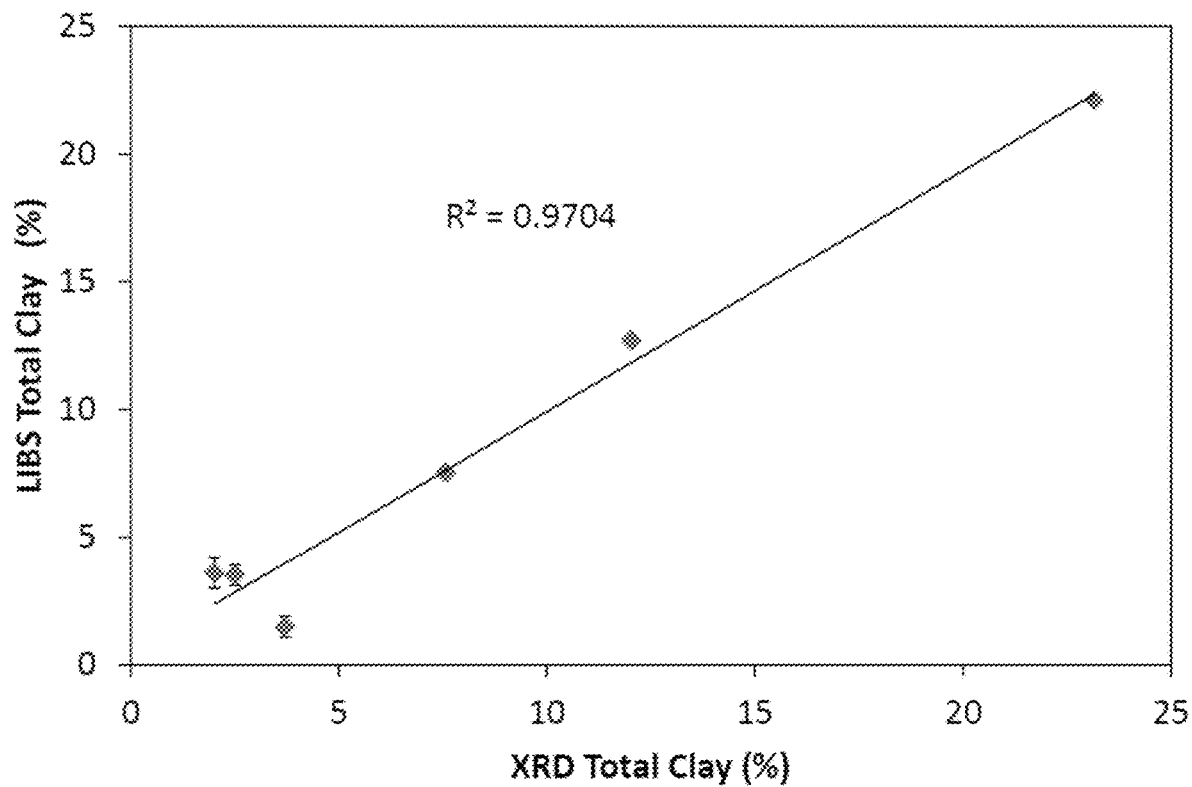
FIG. 7 is a graph, for an oil sands sample, depicting LIBS percentage total clay results versus percentage total clay determined using XRD.
Figure 8:
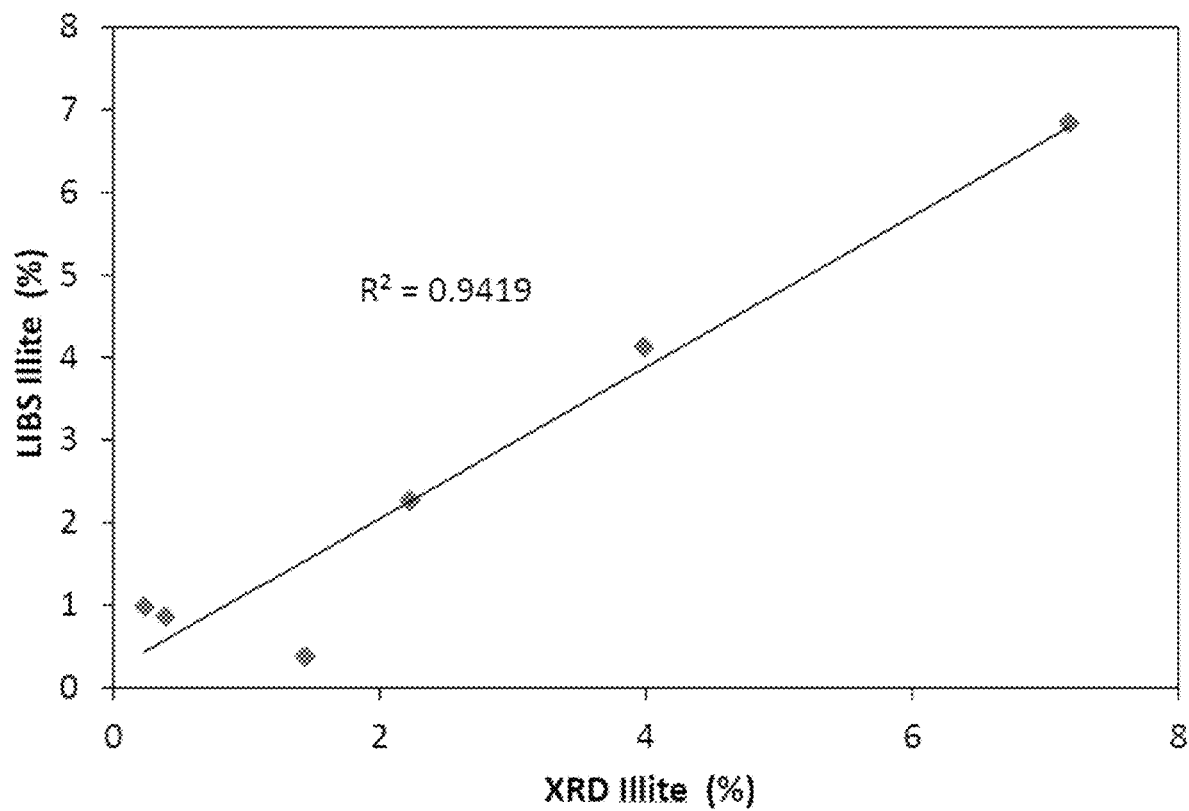
FIG. 8 is a graph, for an oil sands sample, depicting LIBS percentage Illite results versus percentage Illite determined using XRD.
Figure 9:
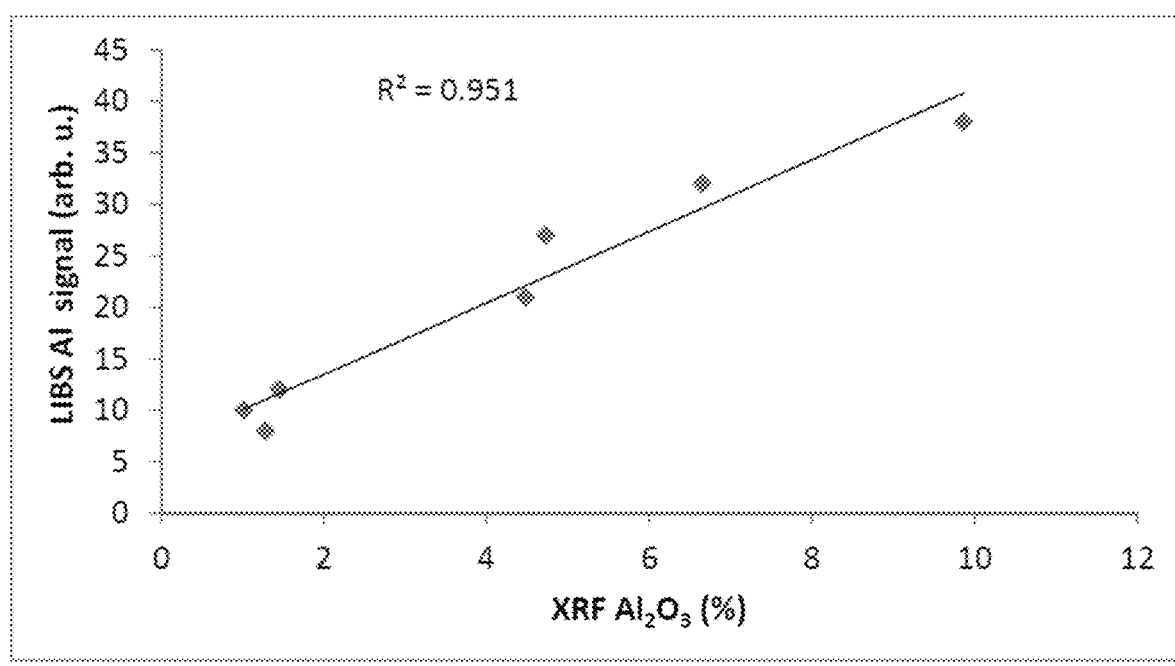
FIG. 9 is a graph, for an oil sands sample, depicting normalized LIBS aluminum line signal versus percentage aluminum oxide determined using x-ray fluorescence (XRF)
Figure 10:
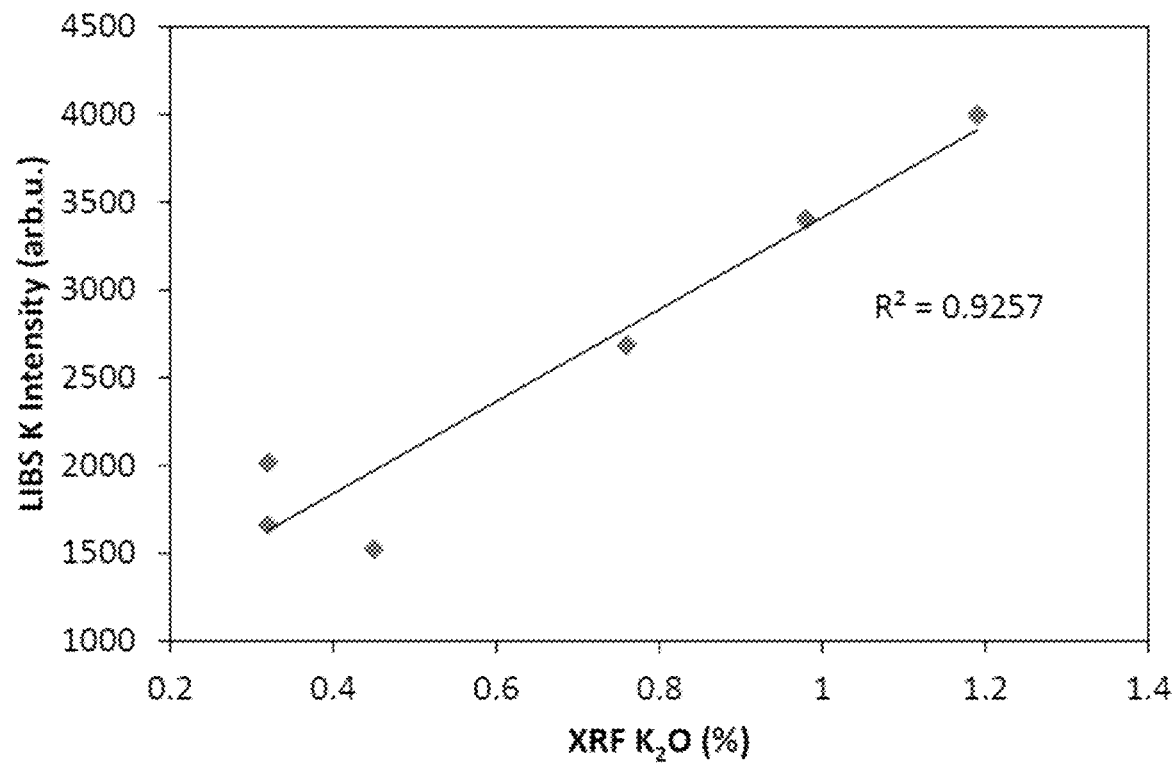
FIG. 10 is a graph, for an oil sands sample, depicting normalized LIBS potassium line versus potassium oxide determined using XRF.

In one embodiment, the system 200 is used to for determining the properties of an oil sands sample. In other embodiments, the system 200 may be used to determine the properties of potash, cement, fertilizer, soil, flour, or any other suitable aggregate sample, FIG. 3 to FIG. 10 provide test results for the LIBS method compared with conventional methods, for an oil sands sample. The root mean square error of calibration (RMSEC) and of predictions (RMSEP) were calculated from the test set results to evaluate the accuracy of the measurement. FIG. 3 is graph depicting normalized LIBS carbon line signal versus percentage bitumen determined using the Dean-Stark method. FIG. 4 is a graph depicting LIBS percentage water validation results versus percentage water determined via the Dean-Stark method. FIG. 5 is a graph depicting LIBS percentage solids validation results versus total solids determined via the Dean-Stark method. FIG. 6 is a graph depicting LIBS percentage quartz validation results versus percentage quartz determined using x-ray diffraction (XRD). FIG. 7 is a graph depicting LIBS percentage total clay validation results versus percentage total clay determined using XRD. FIG. 8 is a graph depicting LIBS percentage Illite validation results versus percentage Illite determined using XRD. FIG. 9 is a graph depicting normalized LIBS aluminum line signal versus percentage aluminum oxide determined using x-ray fluorescence (XRF). FIG. 10 is a graph depicting normalized LIBS potassium line versus potassium oxide determined using XRF.

Figure 11:
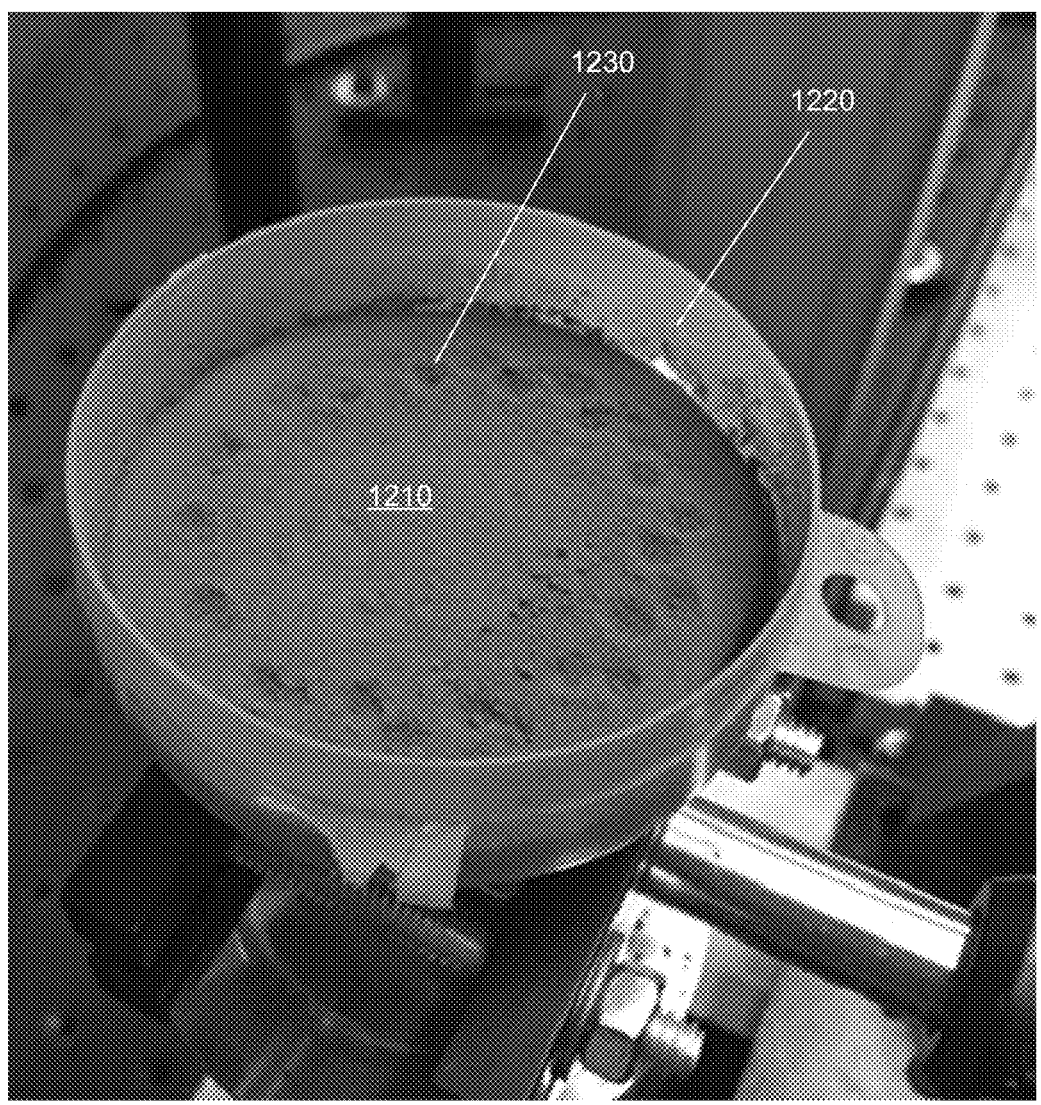
FIG. 11 shows a setup used to measure gold in pulverized silicon-rich rocks pulp.

FIG. 11 shows a setup used to measure gold in pulverized silicon-rich rock pulp. About 30 g of pulverized material 1210 were placed in a cylindrical container 1220 having a diameter of about 10 cm. A laser system operating at 0.5 Hz with a laser pulse of 40 mJ and pulse width of 9 ns was focused on the powder surface by a 20 cm focal length lens for plasma production. The laser spot size was around 600 µm. Plasma light was collected, through an optical fiber bundle, onto the entrance slit of a Czerny-Turner spectrometer coupled to an intensified camera ICCD. In total 100 laser shots were performed at different fresh locations on the surface. Craters 1230 were induced by a few of the lasers shots. Each crater was created by one single shot induced by a first laser shot, then a second shot was focused inside the crater to produce plasma characteristic of the sample which is then utilized to perform spectrochemical LIBS analysis as described above. The gold concentration was determined from LIBS measurements using an averaged spectrum of 100 shots. The Relative Standard Deviation (RSD) was obtained from 5 replicas of 100 shots each.

Figure 12:
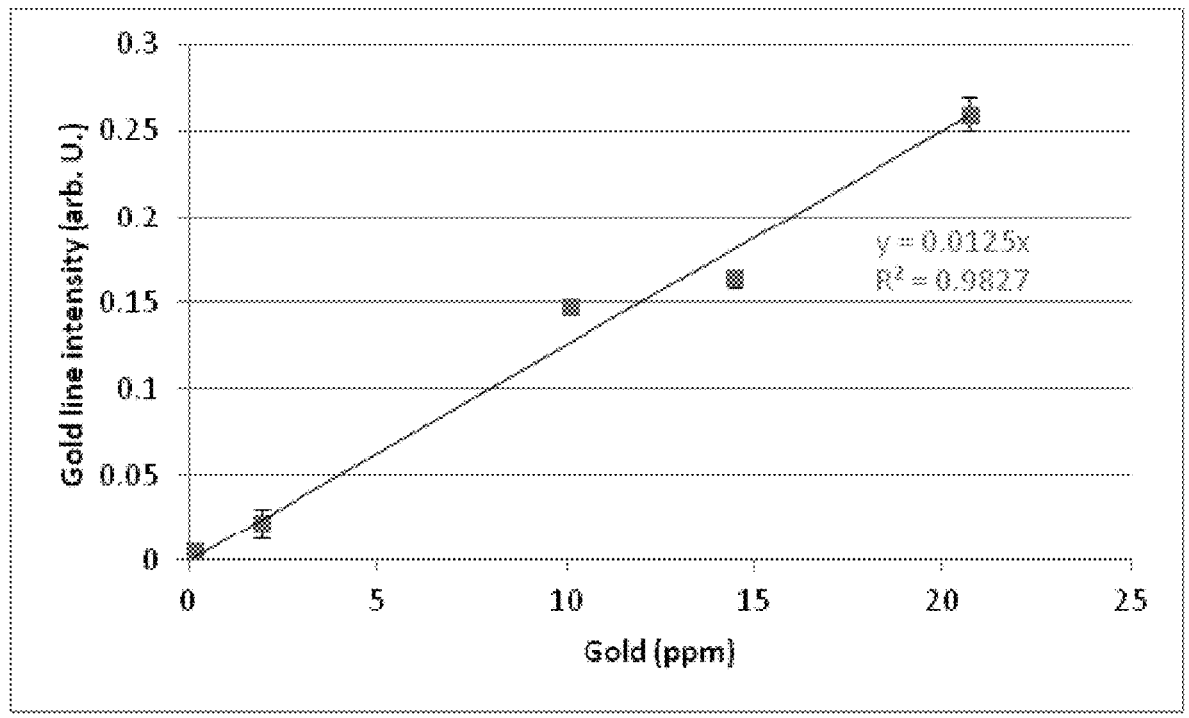
FIG. 12 is a correlation curve between gold line intensity, and the concentration of gold determined by the setup of FIG. 11.

FIG. 12 is a correlation curve between gold line intensity, and the concentration of gold (measured in ppm), as determined by the setup shown in FIG. 11. In the correlation curve of FIG. 12, the gold intensity (I) at 267.59 nm has been normalized by the background. The normalized intensity shows good linearity with the gold concentration from 0 to 20 ppm. The solid lines represent a linear fit with the good coefficient of determination R2=0.9827. The relative standard deviation (RSD) of the 5 replicas of 100 shots each is shown by the error bars.

The above-described embodiments are intended to be examples of the present invention and alterations and modifications may be effected thereto, by those of skill in the art, without departing from the scope of the invention, which is defined solely by the claims appended hereto.

The invention claimed is:

1. A method of determining at least one property of an aggregate sample, comprising:
   (a) applying a first laser pulse to the aggregate sample for creating a crater on a surface of the aggregate sample by shockwave effect;
   (b) applying, after applying the first laser pulse by a duration of time, a second laser pulse in the crater, the second laser pulse for producing a plasma spectral emission;
   (c) detecting the spectral emission with at least one spectrum detector to collect spectral data;
   (d) repeating steps (a), (b), and (c) on different locations on the aggregate sample;
   (e) excluding non-representative spectral data; and
   (f) applying a calibration loading to determine the at least one property of the aggregate sample.

2. The method of claim 1, wherein the aggregate sample is a soil sample.

3. The method of claim 1, wherein the aggregate sample is a fertilizer sample.

4. The method of claim 1, wherein the aggregate sample is a potash sample.

5. The method of claim 1, wherein the aggregate sample is a flour sample.

6. The method of claim 1, wherein the aggregate sample is a cement sample.

7. The method of claim 1, wherein the aggregate sample is a powdered or pulverized ore sample.

8. The method of claim 1, wherein the aggregate sample is an oil sands sample.

9. The method of claim 8, wherein the at least one property comprises the percentage content of one or more of: bitumen, water, and solids.

10. The method of claim 8, wherein the at least one property comprises at least one mineralogical composition selected from the group consisting of: quartz, kaolinite, illite, and total clays.

11. The method of claim 8, wherein the at least one property comprises at least one element content selected from the group consisting of: aluminum, potassium, and iron.

12. The method of claim 8, wherein the at least one property comprises the percentage content of bitumen in the sample.

13. The method of claim 12, wherein determining the percentage content of bitumen is determined by calibrating carbon to silicon peak ratios with a reference value of bitumen obtained from the Dean Stark method.

14. The method of claim 13, further comprising comparing the carbon to silicon ratios in the spectral emission with calibration data.

15. The method of claim 12, wherein the percentage of bitumen is determined from a chemometric model relating spectral data obtained from a known oil sands sample to a reference value obtained from the Dean Stark method.

16. The method of claim 1, further comprising averaging the spectral data prior to applying the calibration loading.

17. The method of claim 1, wherein the aggregate sample is in motion, and wherein the duration of time is based on a speed of motion of the aggregate sample and selected such that the second laser pulse is applied in the crater formed by the first laser pulse.

18. The method of claim 1, wherein the excluding of non-representative spectral data comprises an assessment of a fluence produced by the second laser being applied to the crater.

19. The method of claim 18, wherein the assessment of the fluence is based on a ratio of ions to atoms detected in the plasma spectral emission.

20. The method of claim 19, wherein the ratio of ions to atoms is determined by:

$$\frac{2(2\pi m_e k)^{3/2}}{h^3} \frac{1}{N_e} \left( \frac{g_i A_i \lambda_a}{g_a A_a \lambda_i} \right) T_e^{3/2} \exp\left(-\frac{E_{ion}}{kT_e}\right) \exp\left[\frac{-(E_{exc,i} - E_{exc,a})}{kT_{exc}}\right]$$

wherein h is the Planck constant, c is the velocity of light, $g_a$ is the statistical weight and $A_a$ the Einstein coefficient of the excited level of the atomic transition, $\lambda_a$ is the emission wavelength of the atomic transition, $N_a$ is the number density of atoms in the upper level, $T_{exc}$ is the excitation temperature, $U(T_{exc})$ is the partition energy, k is Boltzmann's constant, $E_{exc,a}$ is the atomic excited level energy, $m_e$ is the mass of the electron, $N_e$ is the electron number density, $g_i$ is the statistical weight and $A_i$ the Einstein coefficient of the excited level of the ionic transition, $\lambda_i$ is the emission wavelength of the ionic transition, $T_e$ is the ionization temperature, $E_{ion}$ is the ionization energy and $E_{exc,i}$ the ionic excited level energy.

21. The method of claim 18, wherein the excluding is based on comparing the assessed fluence and a predetermined fluence range.

22. The method of claim 21, wherein the predetermined fluence range is based on experimentation involving a test aggregate sample with a generally smooth surface.

23. The method of claim 1, wherein the excluding of non-representative spectral data is based on a selection tool.

24. The method of claim 23, wherein the selection tool comprises one or more of: the total plasma intensity, and the intensity of particular emission lines.

25. The method of claim 1, wherein the excluding of non-representative spectral data is based on the use of one or more statistical tools.

26. The method of claim 25, wherein the one or more statistical tools comprise: medium absolute deviation, the minimum covariance determinant method, and principal component analysis.

27. The method of claim 1, wherein the calibration loading is obtained from a chemometric model relating spectral data obtained from a known aggregate sample to a reference value obtained from a physiochemical analysis method for determining the at least one property for the known aggregate sample.

28. The method of claim 27, wherein the chemometric model comprises one or more of: preprocessing methods, Partial Least Squares (PLS), Support Vector Machine (SVM), Principal Component Regression (PCR) methods, Artificial Neural Networks ANN), and chemometric classification and clustering methods.

29. The method of claim 1, wherein the at least one property comprises the percentage content of one or more constituent substances in the aggregate sample.

30. The method of claim 1, wherein the at least one property comprises at least one mineralogical composition.

31. The method of claim 1, wherein the at least one property comprises at least one element content.

32. The method of claim 31, wherein the at least one element content is determined by calibrating normalized lines or raw lines of the at least one element by reference values given by a known method of determination of elemental content.

33. The method of claim 32, wherein the known method of determination of elemental content is one of: x-ray fluorescence and atomic absorption.

34. The method of claim 1, wherein the at least one property comprises the percentage content of an element in the sample.

35. The method of claim 34, wherein determining the percentage content of an element in the sample is based on a calibration with a reference value obtained from the Dean Stark method.

36. The method of claim 34, wherein the percentage content of the element is determined from a chemometric model relating spectral data obtained from a known aggregate sample to a reference value obtained from the Dean Stark method.

* * * * *